Figure 1:
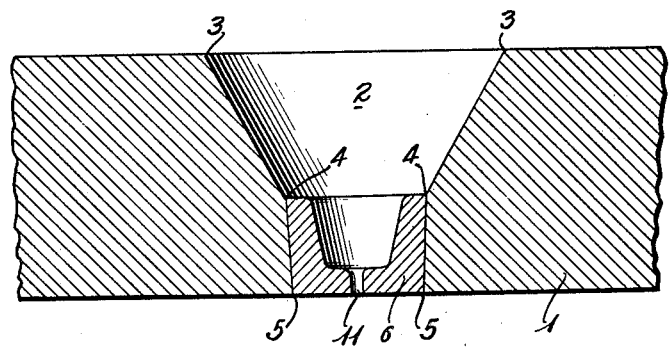

Jan. 21, 1958  W. DE WOLF  2,820,374
PROCESS FOR MAKING SPINNERETS FOR MELT SPINNING
Filed July 10, 1952

INVENTOR
Willem de Wolf
BY Stevens, Davis, Miller & Mosher
ATTORNEYS

United States Patent Office 2,820,374
Patented Jan. 21, 1958

2,820,374

PROCESS FOR MAKING SPINNERETS FOR MELT SPINNING

Willem De Wolf, Arnhem, Netherlands, assignor, by mesne assignments, to American Enka Corporation, Enka, N. C., a corporation of Delaware Application July 10, 1952, Serial No. 298,042

Claims priority, application Netherlands November 23, 1949

4 Claims. (Cl. 76—107)

This invention relates to a process for melt-spinning high polymeric substances and to the products obtained thereby, as well as to the spinnerets used in the spinning process and to the process for manufacturing these spinnerets. This application is a continuation-in-part of my copending U. S. application Serial No. 192,969, filed October 30, 1950.

One of the principal objects of the present invention is to provide a new and improved method for melt-spinning high polymeric substances. A still further object of the invention is to provide a method for manufacturing spinnerets useful in carrying out melt-spinning operations upon high polymeric substances, as well as the spinnerets themselves.

The manner in which these and other objects and features of the invention are attained will appear more fully from the following description thereof, in which reference is made to typical and preferred procedures in order to indicate more fully the nature of the invention, but without intending to limit the invention thereby.

In melt-spinning high polymeric substances, such as superpolyamides (nylon), polyurethanes, polyvinyl compounds and the like, the pressures to which the high polymer melt is subjected on the inside of the spinneret as it is being forced through the holes of the spinneret to form the threads or filaments are usually very high in view of the relatively high viscosities of the molten high polymeric material undergoing spinning. This pressure generally is of the order of at least 10 atmospheres, and frequently rises as high as 40 and even to 100 atmospheres in certain instances.

In view of the solidification of the high polymeric substance as it undergoes cooling upon being squirted through the spinneret orifices into the air, it is generally necessary that the holes of the spinneret be spaced a substantial distance from each other since otherwise the freshly spun threads or fibers may give rise to difficulties due to their sticking together during the cooling process. For this purpose a spacing of at least 3 to 5 mm. between the holes in the spinneret is generally necessary. It follows that if an artificial thread comprising a rather large number of single fibers is to be spun in this fashion, the bottom of the spinneret in which the holes are present may often reach a diameter of about 6 cm. or more.

In order to carry out melt-spinning operations under the circumstances just mentioned wherein such high internal pressures are encountered, it is necessary to manufacture the spinnerets from a particularly strong material. As a rule a special steel is used for the spinneret material, which steel is not only strong but also completely resistant to the molten polymeric materials; although base metals or alloys other than steel which are also resistant under the circumstances mentioned may also be used.

In the conventional wet-spinning process of viscose manufacture, the circumstances prevailing during the spinning operation are quite different. The internal pressures in the spinnerets employed in the viscose process are in general not higher than a few atmospheres. Moreover, the holes in the spinneret may be spaced as closely as ½ mm. or less from each other. As a consequence, it became obvious at a fairly early stage of development of the viscose art to employ spinnerets that were manufactured completely from precious metals and alloys thereof such as platinum, platinum-iridium, gold-platinum and gold-palladium. In order to permit the use of cheaper materials, some efforts have been made in the past to manufacture spinnerets for viscose manufacture largely from stainless steel or nickel by a procedure whereby precious metal inlays were fitted in the places where the holes were to be provided. However, such spinnerets could not adequately fulfill the requirements in the long run because the insertion of the precious metal inserts into the very thin bottom metal of the spinnerets at such a short distance from each other was generally attended with too many difficulties, and it was soon found that the greatly increased costs of manufacture were not compensated for by the value of the material saved. Moreover, it was found that as a consequence of electrolytic action due to the presence of metal couples, increased attack of the base metal of the spinneret occurred.

Surprisingly, the present applicant found that it was possible to employ in high polymer melt-spinning operations a principle known broadly in wet-spinning, wherein precious metal inlays were inserted in base metal spinnerets. This was entirely contrary to any experience in the art because there was no reason to expect that precious metal inlays could give any improvement in the melt-spinning process, since of course in such a process—unlike the viscose process—the spinneret is not immersed in a corroding bath during the spinning operation. Moreover, the base metal is not attacked by molten polymers, and while strong nitric acid is ordinarily employed in cleaning these spinnerets, many types of stainless steel, such as V4a-steel, are known to be very well resistant to such acid. Finally, the fact that the employment of pressures that may range upwardly to as high as 100 atmospheres in melt-spinning operations must be taken into consideration, as distinguished from the, at most, several atmospheres' pressures encountered in viscose spinning, excludes all those methods known to the viscose industry for inserting the precious metal inlays.

Moreover, in view of the cost and the hardness of the materials required, it is not possible for practical reasons to manufacture melt-spinning spinnerets entirely of precious metals.

Thus it is that contrary to what might have been expected by those skilled in the art, according to the present invention it has been found that if in a steel bottom plate of a melt-spinning spinneret inlays of precious metal are inserted and the necessary holes are then punched therein, the extrusion of the molten high polymeric substance through the holes thus formed in the precious metal inlays and the cold drawing of the resulting fibers can quite surprisingly be carried out far better and far more easily. It has been found that the thickness of the threads is far more even, so that with otherwise the same melt-spinning apparatus a much better quality of yarn is spun, and moreover the cold drawing of these spun threads, which operation is known per se and which is one of the most important parts of the process for manufacturing such threads, is found to take place far more easily because substantially less breakage due to breakage of single filaments occurs. Moreover, the resulting product is far less fibrous in nature.

Alternatively, and in accordance with another embodiment of the invention, the precious metal inlays may be first finished to the desired size and shape completely, including punching or drilling the spinning hole in each inlay, after which the finished inlays are then placed in position in the steel bottom plate of the spinneret.

When employing such a spinneret in melt-spinning operations, one may employ the procedure described in the copending U. S. application Serial No. 115,773, filed September 14, 1949 by Theodoor Koch, now abandoned.

It was also found that when using nitric acid of sufficient concentration to clean the spinnerets thus formed, no attack by electric potential differences occurs therein, during the cleaning operation, so that this reason which makes the application of precious metal inlays in wet-spinning in the long run impossible, is not present here.

Although it is possible to insert the precious metal inlays in various ways in the base metal spinneret without departing from the spirit and principle of the invention, yet certain particularly preferable embodiments have been found, and these will be described hereinafter with reference to Figures 1 and 2 of the accompanying drawing. Thus, it was found particularly preferable that the thickness of the metal bottom plate of the spinneret be at least 3 mm., while the distance between the centers of the holes in the spinneret should be preferably not less than 3 mm. The holes in the base metal spinneret, in which the gold or other precious metal inlays are inserted, preferably consist of two parts, the conicity or taper of which can be different. In the part lying near the outside face of the spinneret is disposed the precious metal inlay, the length of which is less than one-half the thickness of the metal plate. The conicity or taper of that part of the hole in the base metal plate in which the precious metal has been placed preferably lies between 1° and 6°. The conicity or taper of the remainder of the hole is such greater, and may be of the order of 60°. The use of stainless steel, for example V4a-steel, as the bottom material of the spinneret is preferred.

Figure 2:
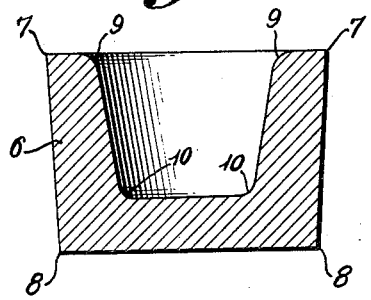
Figure 3:
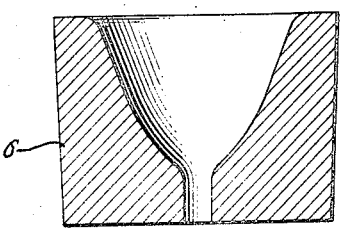

Referring now to the accompanying drawing, Figure 1 shows on an enlarged scale a section of a part of the bottom of a steel spinneret, provided with a precious metal inlay with a spinning hole;

Figure 2 is a section of the precious metal inlay per se as it is ready to be inserted into the bottom of the steel spinneret, and before it has had the spinning hole punched or drilled therein; and Figure 3 is a section of a different form of the precious metal inlay per se, characterized by an internally streamlined configuration.

Referring to Figure 1, there is shown a portion of a melt-spinning spinneret having a stainless steel bottom plate 1 having a thickness of 5 mm. This spinneret has a plurality of holes 2 punched or otherwise formed therein, of which one is shown in the drawing. On the inside of the spinneret the diameter 3—3 of this hole is 6.5 mm. The hole consists of two parts of different conicity or taper. The part of the conical hole which opens toward the inside of the spinneret has a depth of 3 mm., and is tapered with a conicity of 60° from a diameter of 6.5 mm. at 3—3 to a diameter of 2.7 mm. at 4—4. From 4—4 to the outside 5—5 of the stainless steel plate 1 the hole 2 has a taper of 3° from a diameter of 2.7 mm. at 4—4 to a diameter of 2.5 mm. at 5—5. Although the conicity or taper of these two portions of the hole in the bottom of the spinneret may be different from the values just mentioned, it has been discovered that for best results as regards the firm disposition of the precious metal inlay in the bottom plate of the spinneret the conicity of the second part of the hole lying between 4—4 and 5—5 should be restricted and should preferably lie between 1° and 6°. When stainless steel is employed as the base metal of the bottom plate 1, a 3° taper is found to give very advantageous results.

Thus, the hole in the stainless steel spinneret is characterized in that it consists of two parts, the part lying nearer the outside face of the spinneret having a conicity or taper lying between 1° and 6°, preferably 3°, and the remaining portion being of substantially greater conicity or taper.

It has been discovered that the precious metal inlay can be formed very conveniently by cutting pieces of a length of 1.7 mm. from a precious metal wire, for example one consisting of 70% gold and 30% platinum, with a circular cross section having a diameter of 2.6 mm. Thereafter this inlay is formed under very high pressure in a suitably adapted punching apparatus until it acquires a cup-shape, as indicated in Figure 2. The cup-shaped precious metal inlay there shown consists of a body portion 6 which on one end 7—7 has an outer diameter of 2.7 mm. and on the other end 8—8 a diameter of 2.5 mm. In this piece a cup is formed which at the top 9—9 has a diameter of 1.8 mm. and at the bottom 10—10 a diameter of 0.8 mm., while the thickness of the precious metal at the bottom amounts to 0.45 mm. at the most, and preferably 0.40 mm. (between the planes 8—8 and 10—10).

By means of a suitable stamp or press this cup-shaped precious metal inlay is now set in the conveniently adapted lower part of the hole 2 previously formed in the steel bottom 1 of the spinneret. After all the holes in the steel spinneret bottom have been provided in this manner with inlays having cup-shaped recesses, the spinning holes 11 are then formed in each of those inlays by drilling or one of the other ways known in the viscose industry and, if necessary, the spinneret is polished on the outside. The spinneret is then ready for use in melt-spinning.

As an alternative procedure in manufacturing spinnerets useful in melt-spinning according to the present invention, the present applicant also discovered that the precious metal inlays could be first completely finished, including the drilling or punching of the spinning orifice in each inlay, prior to assembling the inlays in the bottom plate of the base metal spinneret.

According to this modification, the precious metal inlays are first manufactured as shown in Figure 2 to very close tolerances and then the spinning orifice 11 is drilled or punched in each one while the inlay blank is held in a suitable die or holding fixture to prevent deformation of the inlay during the perforating operation. The perforated inlay pieces are then polished to remove tiny rough edges, after which they are inserted in the bottom plate of the base metal spinneret. When these manufacturing operations are carried out with care and due attention to maintaining all dimensions, both of the spinneret and of the inlay pieces, very exact, the precious metal inlay pieces can be fitted into the tapered holes provided in the base metal spinneret so that the surfaces of the inlay pieces will be flush with the surface of the bottom plate of the spinneret, but without deformation of the tiny spinning hole.

As a still further modification of the present invention, it has also been found that it is not necessary to give the precious metal inlays the particular cup shape shown more particularly at 9—10—10—9 of Figure 2. On the contrary, good results in melt-spinning are also obtained if the internal walls of the precious metal inlays are given a streamline shape, provided the thickness of the precious metal at the bottom is maintained, as before, at about 0.45 mm. at the most, and preferably about 0.40 mm. This internally streamlined shape may be conveniently imparted to the precious metal inlay pieces by forming them under very heavy pressure in a suitably adapted punching apparatus as before, it being necessary only to employ an appropriately shaped male die to confer the desired streamlining effect.

It is to be particularly understood that the precious metal inlay pieces may be given the internally streamlined configuration as and in the manner described above irrespectively of whether the spinning orifices 11 are incorporated therein before or after positioning them in the base metal spinneret, in accordance with either of the methods of manufacture also described above.

It has been found that in practice spinnerets made up as described above are completely resistant to the high pressures occuring during the melt-spinning process and that they give a product characterized by extraordinarily regular single filaments.

In order to indicate still more fully the nature of the present invention, the following examples of typical procedure are set forth, it being understood that this description is presented by way of illustration only, and not as limiting the scope of the invention.

*Example 1*

Polyamino-caproic amide having an intrinsic viscosity of 0.96 was melted at a temperature of 256° C. in a melt-spinning apparatus of a construction known per se. The molten polyamide was then forced through a filter and then by means of a measuring pump through a spinneret constructed according to the present invention in which ten precious metal inlays formed as described above in connection with Figure 1, were present. In each of those precious metal inlays there was provided a spinning hole the mouth of which had a diameter of 250 microns. The precious metal inlays were located in the spinneret in such manner that the ten spinning holes were present on a circle with a diameter of 40 mm.

The quantity of molten polyamide forced through the spinneret amounted to 11 grams per minute. The ten single filaments squirted out from the spinneret were collectively wound as one thread on a rotating spool located at a distance of about 5 meters from the spinneret. This spool had a peripheral speed of 600 meters per minute, as a result of which an artificial thread of 165 deniers, consisting of ten single filaments, was formed. This thread was cold-drawn in accordance with conventional cold-drawing practice to a four-fold length having a final thickness of 45 deniers. On an average only one break occurred per 90 kilometers of thread during this drawing operation.

Furthermore, it appeared from a microscopic examination of the cross-sections of this thread that each single filament had an almost exactly round cross-section. The differences in diameter of the cross-sections of these single filaments visible under the microscope were measured. Practically all the variations lay between 2% and 4% from the largest diameter with a few exceptions which showed a deviation up to 5%.

In order to show the special advantages of the procedure according to the present invention, attention is invited to the following comparative example.

*Example 2*

The procedure of Example 1 was repeated with the sole exception that instead of employing a stainless steel spinneret having precious metal inlays, a spinneret was employed having a stainless steel bottom plate having no precious inlays but in which the spinning holes were formed directly in the stainless steel plate. On cold-drawing the threads spun by means of this spinneret, it was found that there occurred an average of 20 to 25 breaks per 90 kilometers. Moreover, the microscopic examination carried out in the same way as in Example 1 showed that, although the individual filaments were almost exactly round just as were those in Example 1, the differences in diameter were far larger. Measurements showed differences in diameter that varied practically between 8% and 12%, while a few differences in diameter as high as 20% were found.

*Example 3*

The melt-spinning procedure of Example 1 was repeated except that the spinneret was constructed by the alternative procedure described above, viz., the precious metal inlay pieces were completely finished, including the making of the spinning hole 11, prior to inserting them in the base metal spinneret bottom.

The results, both as to relative freedom from breakage of the spun thread and relative freedom of variations in cross-section of the individual filaments, were entirely comparable to those of Example 1.

*Example 4*

The melt-spinning procedure of Example 1 was repeated, except that the precious metal inlay pieces were internally streamlined as described above and as illustrated in Figure 3. The results were comparable in all respects to those of Example 1.

*Example 5*

The melt-spinning procedure of Example 3 was repeated, except that the precious metal inlay pieces were internally streamlined as illustrated in Figure 3. The results are comparable in all respects to those of Example 3.

For applications where it is desired to make the bottom plate 1 of the spinneret unusually thick (e. g., 8–12 mm.) and/or to provide the bottom plate 1 with more than the usual number of spinning orifices, it is sometimes advantageous to make the upper portion of the hole in the bottom plate 1 of cylindrical shape rather than conical shape, that is to say, in Figure 1 the distances 3—3 and 4—4 will be substantially equal, with the taper extending below the plane of 4—4.

While specific examples of preferred methods and articles embodying the present invention have been recited above, it will be apparent that many changes and modifications may be made in the methods of procedure and in fabricating the articles herein described. It will therefore be understood that the examples cited and the particular methods and procedures set forth are intended to be illustrative only and are not intended to limit the invention.

What is claimed is:

1. A process for manufacturing spinnerets for the high pressure melt-spinning of high-polymeric substances comprising cutting a plurality of pieces from a cylindrical wire of precious metal, pressing the pieces into cup-shaped inlays having outer surfaces conforming to that of a truncated cone and having a closed bottom end, setting the inlays into complementary holes formed in a steel spinneret plate having a thickness of at least 3 mm. and thereafter forming a spinning hole in the bottom end of each inlay.

2. A process as in claim 1 in which the inlays are set in holes in the steel spinneret plate, each of said holes having two different portions of different conicity, until the base of each of the inlays and the base of the steel spinneret plate lie in substantially the same line.

3. A process for manufacturing spinnerets for the high pressure melt-spinning of high-polymeric substances comprising cutting a plurality of pieces from a cylindrical wire of precious metal, pressing the pieces into cup-shaped inlays having outer surfaces conforming to that of a truncated cone and having a closed bottom end, forming a spinning hole in the bottom end of each inlay and thereafter setting the inlays into complementary holes formed in a steel spinneret plate having a thickness of at least 3 mm.

4. A process as in claim 3 in which the inlays are set in holes in the steel spinneret plate, each of said holes having two different portions of different conicity, until the base of each of the inlays and the base of the steel spinneret plate lie in substantially the same line.

(References on following page)

References Cited in the file of this patent

UNITED STATES PATENTS

| | | |
|---|---|---|
| 1,420,224 | Simons | June 20, 1922 |
| 1,597,928 | Simons | Aug. 31, 1926 |
| 1,604,216 | Brainin | Oct. 26, 1926 |
| 1,654,936 | Jones | Jan. 3, 1928 |
| 1,672,644 | Hoffmann et al. | June 5, 1928 |
| 1,752,689 | Ohlson | Apr. 1, 1930 |
| 2,051,663 | Werth | Aug. 18, 1936 |
| 2,058,032 | Murphy | Oct. 20, 1936 |
| 2,232,417 | Unckel | Feb. 18, 1941 |
| 2,376,742 | Wempe | May 22, 1945 |

FOREIGN PATENTS

| | | |
|---|---|---|
| 141,840 | Austria | Jan. 15, 1935 |

OTHER REFERENCES

Ser. No. 197,564, Wempe (A. P. C.), published Apr. 27, 1943.

Ser. No. 349,256, Aschenbrenner et al. (A. P. C.), Apr. 27, 1943.